(12) United States Patent
Jarra

(10) Patent No.: US 6,587,090 B1
(45) Date of Patent: Jul. 1, 2003

(54) FINGER SECURABLE COMPUTER INPUT DEVICE

(76) Inventor: Eli D. Jarra, 1431 Calle Artigas, Thousand Oaks, CA (US) 91360

( * ) Notice: Subject to any disclaimer, the term of this patent is extended or adjusted under 35 U.S.C. 154(b) by 140 days.

(21) Appl. No.: 09/678,632

(22) Filed: Oct. 3, 2000

(51) Int. Cl.[7] ................................. G09G 5/00
(52) U.S. Cl. ................. 345/156; 345/173; 345/179
(58) Field of Search ........................... 345/156, 157, 345/158, 173, 179, 168

(56) References Cited

U.S. PATENT DOCUMENTS

| | | | | |
|---|---|---|---|---|
| 5,018,208 A | * | 5/1991 | Gladstone | 382/3 |
| 5,453,759 A | * | 9/1995 | Seeback | 345/158 |
| 5,581,484 A | * | 12/1996 | Prince | 364/559 |
| 5,706,026 A | * | 1/1998 | Kent et al. | 345/156 |

* cited by examiner

Primary Examiner—Richard Hjerpe
Assistant Examiner—Kimnhung Nguyen
(74) Attorney, Agent, or Firm—Joseph N. Breaux

(57) ABSTRACT

A stylus computer input device that includes an input mechanism that is secured to the finger tip pad of a user's index finger. In one embodiment, the computer input device includes a splint structure, a fingertip strap assembly attached to the tip end of the splint structure, two opposed switch button assemblies each extending from an opposed side center edge of the splint structure and having a switch button provided thereon, two winged rear support arms extending from opposed rear side edges of the splint assembly and shaped to extend back over a back portion of a user's hand; and an information input mechanism. Because the input device is secured to the finger with straps and winged support arms, the user does not have to grip the stylus input device with his/her fingers and is thus relieved of this strain to the fingers and hand.

1 Claim, 4 Drawing Sheets

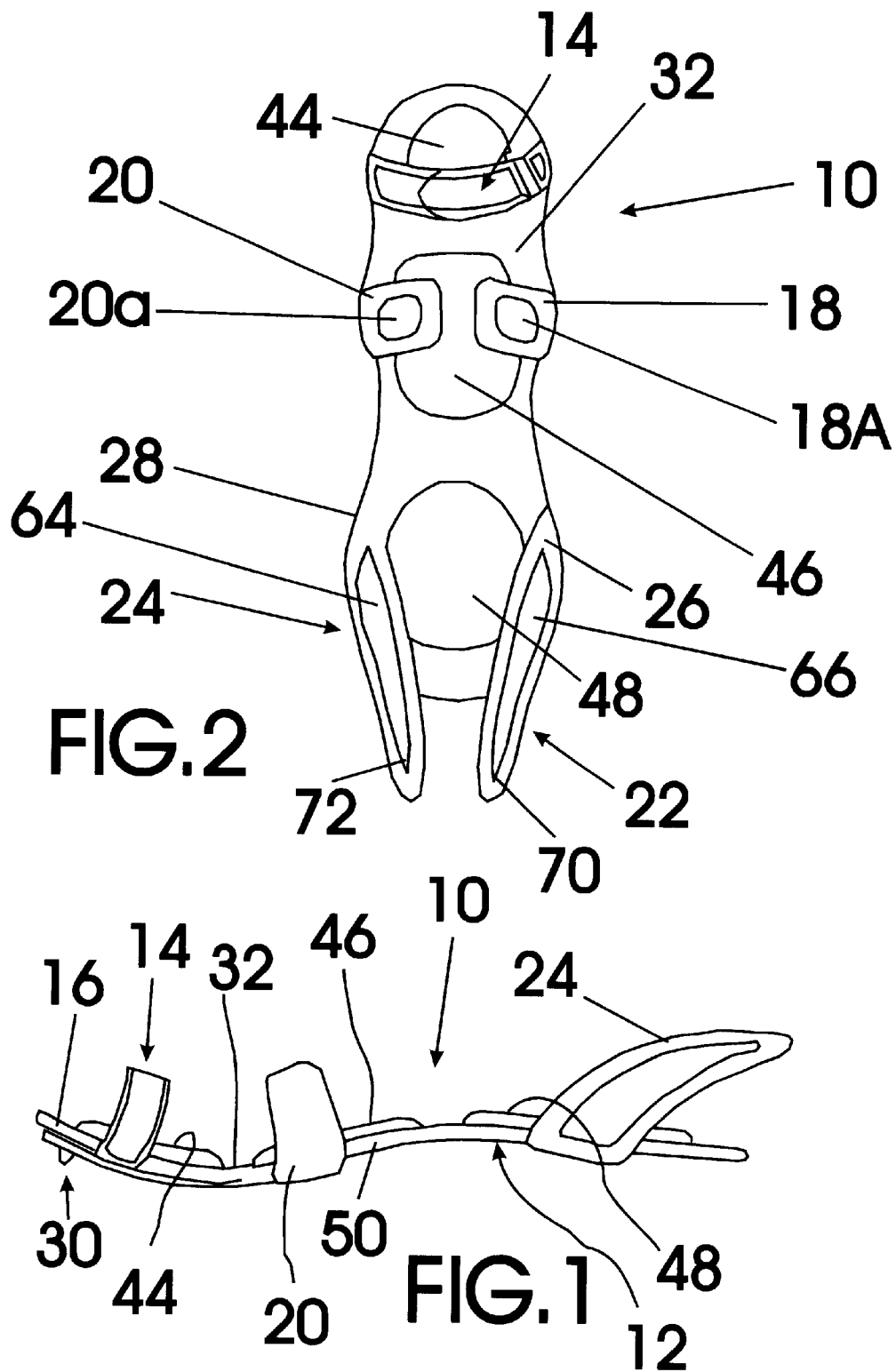

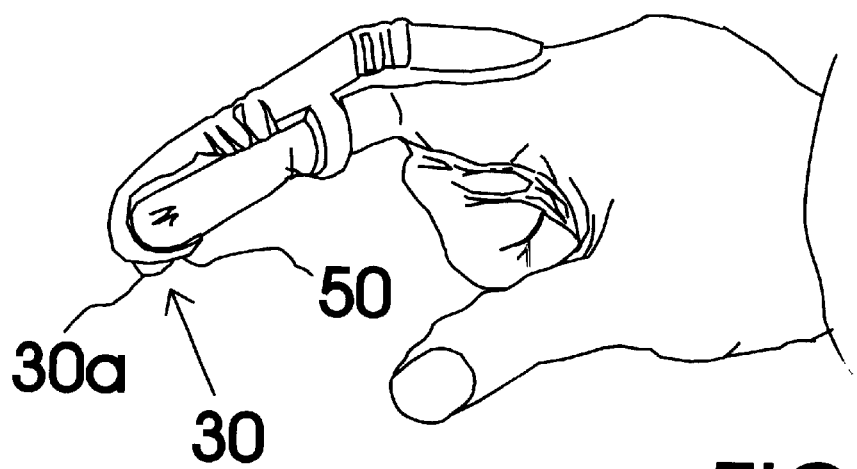
FIG.5
FIG.6
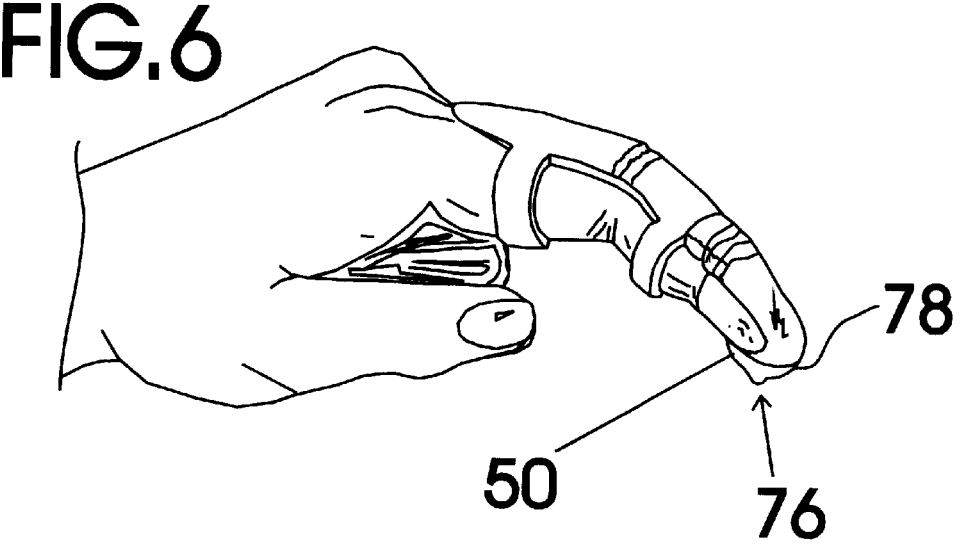

FINGER SECURABLE COMPUTER INPUT DEVICE

TECHNICAL FIELD

The present invention relates to graphic arts accessories for computer graphics and more particularly to a computer input device that is securable to the finger of a user; the finger securable computer input device including a splint structure, a fingertip strap assembly attached to the tip end of the splint structure, two opposed switch button assemblies each extending from an opposed side center edge of the splint structure and having a switch button provided thereon, two winged rear support arms extending from opposed rear side edges of the splint assembly and shaped to extend back over a back portion of a user's hand, and an information input mechanism; the splint structure being formed from plastic and having a finger contact surface shaped to conform to a users's finger and provided with a number of gel pads thereon and a stylus side surface opposite the finger contact surface; the fingertip strap assembly including two flexible straps adjustably securable about a finger tip of a user and securable with a hook and pile fastener; each of the two opposed switch button assemblies being formed from plastic and a having a momentary contact switch mounted thereon at a location above the finger contact surface of the splint structure; the two winged rear support arms being constructed from semi-rigid plastic and having bottom wing sections spaced to fit around a base portion of a user's finger such that wing ends extend over a portion of the back of a user's hand when the base of a user's finger is positioned between the bottom wing sections; the information input mechanism including a length adjustable stylus nib attached to a stylus side surface tip end of the stylus structure that is mechanically connected to a pressure transducer forming a portion of a computer interface circuit connectable to a computer input port; each of the momentary contact switches being electrically connected to the computer interface circuit and programmed to operate as mouse buttons.

BACKGROUND ART

Computer graphic artists typically continuously use an input device such as a mouse or stylus pen for inputting graphic information. These device operate effectively to input the information; however, because of their shapes, they can cause stresses on the hands and wrist of the user that can result in pain and or injury. It would be a benefit, therefore to have an input device for a digital drawing pad that includes an input mechanism secured to the finger tip pad of a user's index finger and which did not require the user to grip the stylus input device with the fingers of the hands.

GENERAL SUMMARY DISCUSSION OF INVENTION

It is thus an object of the invention to provide a finger securable computer input device that includes a splint structure, a fingertip strap assembly attached to the tip end of the splint structure, two opposed switch button assemblies each extending from an opposed side center edge of the splint structure and having a switch button provided thereon, two winged rear support arms extending from opposed rear side edges of the splint assembly and shaped to extend back over a back portion of a user's hand, and an information input mechanism; the splint structure being formed from plastic and having a finger contact surface shaped to conform to a users's finger and provided with a number of gel pads thereon and a stylus side surface opposite the finger contact surface; the fingertip strap assembly including two flexible straps adjustably securable about a finger tip of a user and securable with a hook and pile fastener; each of the two opposed switch button assemblies being formed from plastic and a having a momentary contact switch mounted thereon at a location above the finger contact surface of the splint structure; the two winged rear support arms being constructed from semi-rigid plastic and having bottom wing sections spaced to fit around a base portion of a user's finger such that wing ends extend over a portion of the back of a user's hand when the base of a user's finger is positioned between the bottom wing sections; the information input mechanism including a length adjustable stylus nib attached to a stylus side surface tip end of the stylus structure that is mechanically connected to a pressure transducer forming a portion of a computer interface circuit connectable to a computer input port; each of the momentary contact switches being electrically connected to the computer interface circuit and programmed to operate as mouse buttons.

Accordingly, a finger securable computer input device is provided. The finger securable computer input device includes a splint structure, a fingertip strap assembly attached to the tip end of the splint structure, two opposed switch button assemblies each extending from an opposed side center edge of the splint structure and having a switch button provided thereon, two winged rear support arms extending from opposed rear side edges of the splint assembly and shaped to extend back over a back portion of a user's hand, and an information input mechanism; the splint structure being formed from plastic and having a finger contact surface shaped to conform to a users's finger and provided with a number of gel pads thereon and a stylus side surface opposite the finger contact surface; the fingertip strap assembly including two flexible straps adjustably securable about a finger tip of a user and securable with a hook and pile fastener; each of the two opposed switch button assemblies being formed from plastic and a having a momentary contact switch mounted thereon at a location above the finger contact surface of the splint structure; the two winged rear support arms being constructed from semi-rigid plastic and having bottom wing sections spaced to fit around a base portion of a user's finger such that wing ends extend over a portion of the back of a user's hand when the base of a user's finger is positioned between the bottom wing sections; the information input mechanism including a length adjustable stylus nib attached to a stylus side surface tip end of the stylus structure that is mechanically connected to a pressure transducer forming a portion of a computer interface circuit connectable to a computer input port; each of the momentary contact switches being electrically connected to the computer interface circuit and programmed to operate as mouse buttons.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a side plan view of an exemplary embodiment of the finger securable computer input device of the present invention.

FIG. 2 is a top plan view of an exemplary embodiment of the finger securable computer input device of the present invention.

FIG. 5 is a perspective view of a second exemplary embodiment of the finger securable computer input device using a top of the finger stylus splint and an optical eye transducer for the input mechanism.

FIG. 6 is a perspective view of a third exemplary embodiment of the finger securable computer input device using a top of the finger stylus splint and a conventional magnetically and pressure transducer coupled plastic nib for use with conventional graphic tablets.

EXEMPLARY MODE FOR CARRYING OUT THE INVENTION

Figure 3:
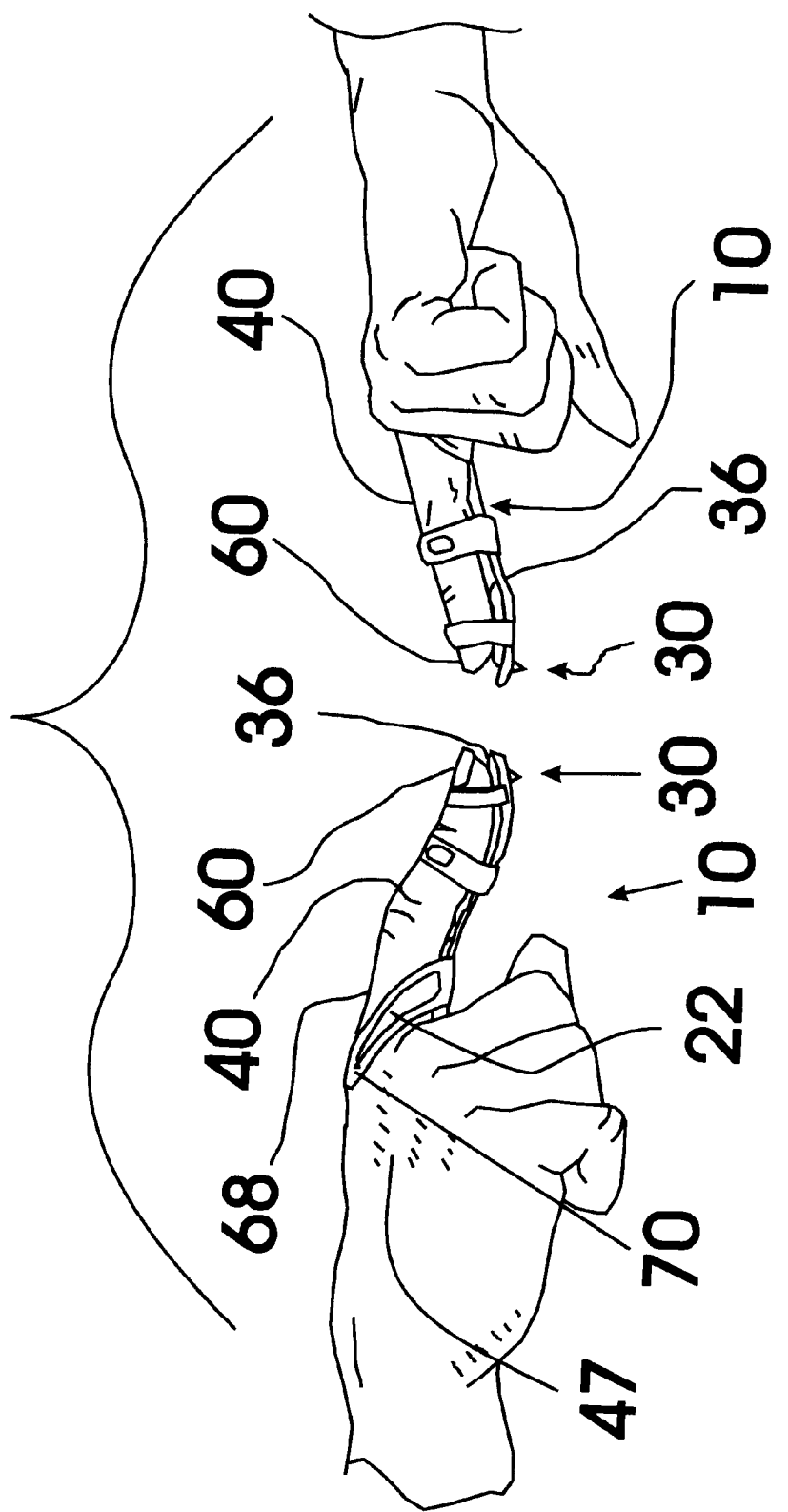
FIG. 3 is a left and a right side view of the finger securable computer input device of FIGS. 1 and 2 secured to the index finger of a user's right hand.
Figure 4:
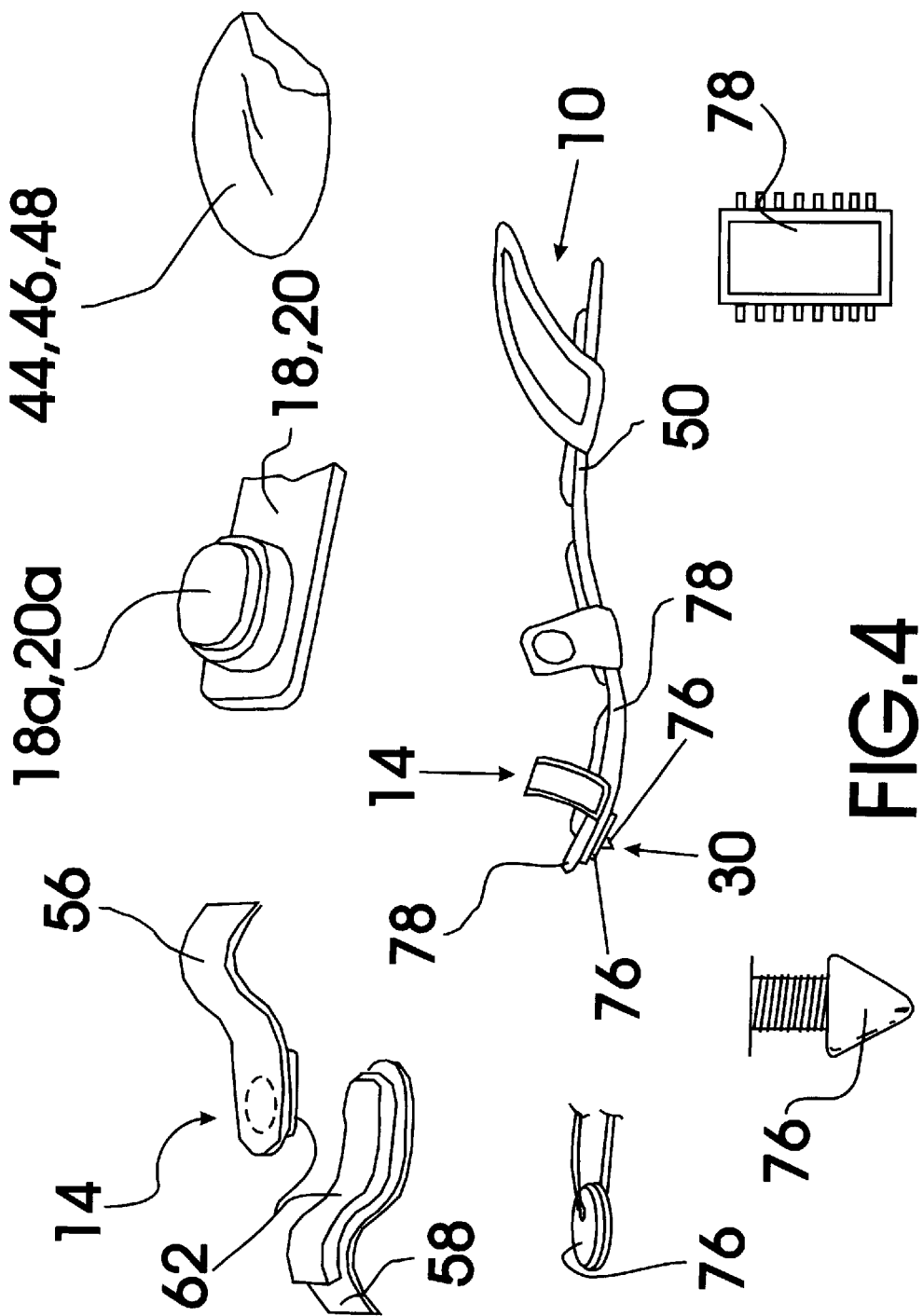
FIG. 4 is a side plan view showing a number of details of various elements of the finger securable computer input device of FIGS. 1 and 2.

FIGS. 1–4 show various aspects of an exemplary embodiment of the finger securable computer input device of the present invention generally designated 10. Finger securable computer input device 10 includes a splint structure, generally designated 12; a fingertip strap assembly, generally designated 14, attached to the tip end 16 of splint structure 12; two opposed switch button assemblies, generally designated 18,20, each extending from an opposed side center edge of the splint structure 12 and having a switch button 18a,20a provided thereon; two winged rear support arms, generally designated 22,24, extending from opposed rear side edges 26,28 of the splint assembly 12 and shaped to extend back over a back portion 47 of a user's hand; and an information input mechanism, generally designated 30.

Splint structure 12 is formed from plastic and has a finger contact surface 32 shaped to conform to the undersurface of a users's finger 40 and provided with three elastomeric gel pads 44,46,48 thereon and a stylus side surface 50 opposite the finger contact surface 32. FIGS. 5 and 6 illustrate another exemplary splint structure 12 that conforms to the upper surface of the users finger. FIGS. 5 and 6 are configured to eliminate the need for fingertip strap assembly 14. Fingertip strap assembly 14 includes two flexible straps 56,58 that are adjustably securable about a finger tip 60 of a user and securable with a hook and pile fastener 62. Each of the two opposed switch button assemblies 18,20 are formed from plastic and a having a momentary contact switch 18a,20a mounted thereon at a location above finger contact surface 32 of splint structure 12. Winged rear support arms 22,24 are constructed from semi-rigid plastic and having bottom wing sections 64,66 spaced to fit around a base portion 68 of a user's finger such that wing ends 70 extend over a back portion 47 of the back of a user's hand when the base portion 68 of a user's finger is positioned between bottom wing sections 64,66.

Information input mechanism 30 including a threaded, length adjustable stylus nib 76 attached to a stylus side surface tip end 78 of stylus structure 12 that is mechanically connected to a piezo pressure transducer 76 forming a portion of a computer interface circuit 78 connectable to a computer input port of a conventional computer. Computer interface circuit 78 can be linked to a conventional computer in any conventional manner such as through a cable, an infrared link or and rf link. In this embodiment, each of the momentary contact switches 18a,20a are electrically connected to computer interface circuit 78 and are programmed to operate as mouse buttons. FIG. 5 shows an information input mechanism 30 in the form of an optical eye transducer assembly 30a.

It can be seen from the preceding description that a finger securable stylus computer input device has been provided.

It is noted that the embodiment of the finger securable computer input device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A finger securable computer input device comprising:

a splint structure having a finger contact surface shaped to conform to the undersurface of a user's finger that is provided with three spaced, elastomeric gel pads, each elastomeric gel pads being positioned to support a separate section of user's finger;

a fingertip strap assembly attached to a tip end of the splint structure;

two opposed switch button assemblies each extending from an opposed side edge the splint structure and having a switch button provided on a surface thereon;

two winged rear support arms extending from opposed rear side edges of the splint assembly and shaped to extend back over a back portion of a user's hand;

a computer interface circuit; and an information input mechanism including a threaded, length adjustable stylus nib carried on a stylus side surface of the tip end of the splint structure;

the information input mechanism being wired in input providing connection with the computer interface circuit;

the splint structure having a finger contact surface shaped to conform to an undersurface of a users's finger that is provided with three elastomeric gel pads thereon for cushioning contact between the finger contact surface and the undersurface of a users's finger;

the stylus side surface of the splint structure being opposite the finger contact surface and having the information input mechanism thereon that includes a length adjustable stylus nib supported at a nib end by a pressure transducer forming a portion of a computer interface circuit connectable to a computer input port of a computer;

fingertip strap assembly includes two flexible straps that are adjustably securable about a finger tip of a user with a hook and pile fastener;

each of the two opposed switch button assemblies having a momentary contact switch provided thereon that are wired in input providing connection with the computer interface circuit;

the winged rear support arms each having a wing end and a bottom wing section spaced apart from the bottom wing section of the other winged rear support arm and adapted, in use, to fit around a base portion of a user's finger such that the wing ends of the two winged rear support arms extend over a back portion of a back of a user's hand when the base portion of a user's finger is positioned between bottom wing sections.

* * * * *